United States Patent

Parker

[15] 3,686,430

[45] Aug. 22, 1972

[54] MUTER FOR SOLID STATE TELEVISION RECEIVERS

[72] Inventor: Louis W. Parker, 2408 Sunrise Key Blvd., Fort Lauderdale, Fla. 33304

[22] Filed: March 25, 1971

[21] Appl. No.: 127,944

[52] U.S. Cl.................178/5.8 A, 325/327, 325/348, 325/378

[51] Int. Cl.................H04n 5/62

[58] Field of Search..............178/5.8 R, 5.8 A, 7.3 R; 325/319, 327, 402, 403, 478, 348

[56] References Cited

UNITED STATES PATENTS 2,173,173 9/1939 Lewis......................178/5.8 R

*Primary Examiner*—Robert L. Griffin
*Assistant Examiner*—George G. Stellar
*Attorney*—William D. Hall, Elliott I. Pollock, Fred C. Philpitt, George Vande Sande, Charles F. Steininger and Robert R. Priddy

[57] ABSTRACT

An intercarrier color television receiver using solid state components is provided with a tuned circuit sharply tuned to the intercarrier frequency for selectively producing a control signal. The control signal controls the conduction of a field effect transistor which in turn controls generation of a potential operative to selectively render the receiver's picture producing means and sound producing means inoperative. A bias source coupled to the control electrode of the field effect transistor nullifies spurious control signals produced by the tuned circuit upon reception of noise alone.

17 Claims, 1 Drawing Figure

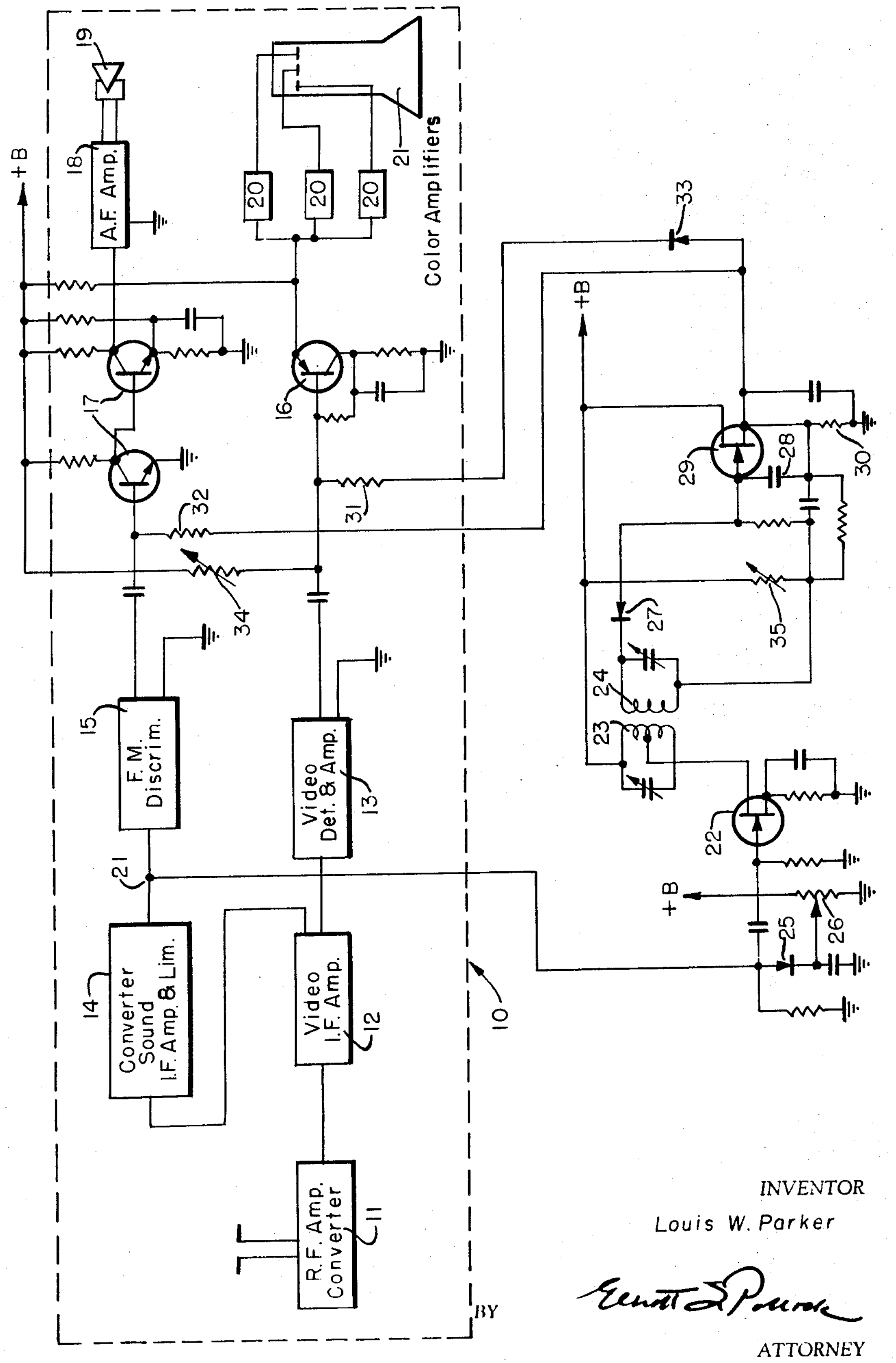
INVENTOR
Louis W. Parker
BY
ATTORNEY

MUTER FOR SOLID STATE TELEVISION RECEIVERS

CROSS REFERENCE TO RELATED APPLICATIONS

This application is an improvement on the subject matter described in my prior copending application Ser. No. 77,831, filed Oct. 5, 1970, now U.S. Pat. No. 3,621,125 for "Muter for Television Receivers" which is in turn a continuation in part of my application Ser. No. 785,494 filed Dec. 20, 1968, for the same subject matter and now abandoned.

BACKGROUND OF THE INVENTION

In my prior copending application Ser. No. 77,831 identified above, various circuits are discussed for use in television receivers, and operative to reduce or mute sound intensity and/or to darken the picture tube of the receiver when the receiver is detuned. Specific arrangements are disclosed and claimed for rendering the muter circuit less sensitive to received noise.

More particularly, the arrangement described in my prior application contemplates a muter for intercarrier television receivers provided with an intercarrier sound system, and operative, upon reception of picture carrier and sound carrier signals spaced from one another by an intercarrier frequency, to supply video signals to a picture producing means and frequency modulated sound signals to a sound producing means. To control muting, a tuned circuit is provided which is applied ahead of the sound discrimination in the receiver intercarrier sound system and which is more sharply tuned to the 4.5 MC intercarrier frequency than is the intercarrier sound system of the receiver thereby to reduce the effect of noise signals at said tuned circuit; and the tuned circuit functions to produce a control signal, upon reception of proper television signals, which is in turn used to control operation of the sound producing means and picture producing means of the receiver. The operation is such that, in the absence of reception of spaced picture carrier and sound carrier signals, the receiver is prevented from producing a visible picture or clearly audible sound; but upon reception of proper television signals the muter circuit functions to permit the receiver's sound and picture channels to operate in normal fashion.

The fundamental principles of operation of the present invention are the same as those discussed above; and the disclosure of my aforementioned prior copending application Ser. No. 77,831 is accordingly incorporated herein by reference for a full discussion of those principles of operation. The present invention is particularly concerned with the provision of a novel circuit making use of the fundamental principles of operation described to control television receivers employing solid state components, and more particularly to control color television receivers of the solid state type.

SUMMARY OF THE INVENTION

The present invention contemplates a muter of the general type described in my aforementioned copending application Ser. No. 77,831, employing a tuned circuit partly separated from the intercarrier sound system of the receiver and sharply tuned to the intercarrier frequency for generating a control signal upon reception of properly spaced picture carrier and sound carrier signals. In accordance with the present invention, and in order to adapt the principles of my prior copending application to use in a solid state receiver, the tuned circuit is coupled to the receiver by means of a field effect transistor circuit which may, if desired, include a diode limiter to eliminate high surges of noise thereby to improve the noise rejection of the tuned circuit. An output signal produced by the tuned circuit controls the state of conduction of a second field effect transistor which, in turn, controls the generation of a potential operative to separately control transistorized coupling circuits located respectively in the picture and sound channels of the receiver, thereby to control operation of the sound producing means and picture producing means of the receiver.

The second field effect transistor mentioned above is so arranged that, in the absence of a control signal of predetermined polarity impressed on the control electrode of the second field effect transistor from the tuned circuit, the second field effect transistor is conductive. In these circumstances, its source current flows through a resistor in series with this second field effect transistor to generate a control potential which is in turn operative to cut off a transistor amplifier located in the sound channel of the receiver and/or to raise the potential at the output of a transistor emitter follower circuit located in the video channel of the receiver thereby to cut off the electron beam in the color television picture tube. Upon reception of proper television signals, the control signals produced by the sharply tuned circuit cuts off the second field effect transistor thereby to prevent generation of the aforementioned potential, and thus permits the sound and picture channels of the receiver to operate in normal fashion.

In order to prevent unlocking of the muter due to spurious signals produced by the tuned circuit upon reception of noise alone, a bias source is coupled to the control electrode of the second field effect transistor. This bias source produces a bias potential having a polarity opposite to that of control signals normally impressed on said control electrodes from the tuned circuit, and a magnitude sufficient to nullify spurious control signals produced by noise alone, but insufficient to block proper output signals produced when the receiver receives the weakest spaced sound and picture carrier signals present in the area of reception. The bias potential is preferably variable to permit its adjustment relative to the amplitude of the weakest television signal being received, thereby to assure proper reception of that signal while simultaneously decreasing the effects of noise alone.

The operation of the overall muter is such that when proper television signals are received, the second field effect transistor is cut off; and this assures that the muter circuit operates properly even though high level noise signals may simultaneously be received.

BRIEF DESCRIPTION OF THE DRAWING

The single FIGURE is a diagrammatic illustration of an improved solid state muter constructed in accordance with the present invention.

DESCRIPTION OF THE PREFERRED EMBODIMENT

As illustrated in the drawing, the present invention is adapted to control muting operations of the audio and picture channels in a color television receiver, generally designated 10, and comprising solid state components. The various stages of receiver 10 illustrated in the drawing are conventional, and they include an R.F. amplifier and frequency converter stage 11, a video I.F. amplifier 12, a video detector and amplifier 13, a converter to sound I.F. and its amplifier limiter 14, and a FM discriminator 15. These components, and their interaction and operation, are conventional in intercarrier television receivers; and they function, upon reception by the receiver of picture carrier and sound carrier signals spaced from one another by an intercarrier frequency, to produce video signals in a video channel at the output of stage 13 and audio frequency signals at the output of stage 15. The picture signals at the output of the video detector and amplifier 13 are coupled to a transistor emitter follower 16; and the output of stage 16 is coupled to the inputs of three conventional color amplifiers 20 and thence to the three control grids of color television cathode ray tube 21. The audio output from stage 15 is similarly coupled to the input of a two-stage transistor amplifier 17, the output of which supplies signals to an audio frequency amplifier 18 and thence to speaker 19.

It will be understood that the general arrangement of receiver 10 as illustrated has been simplified for ease of understanding. It is conventional to provide various auxiliary components and circuits additional to those specifically illustrated and described; but inasmuch as these are conventional, and are not necessary to an understanding of the present invention, no detailed illustration or description of them is required.

The transistor emitter follower 16 in the video channel of receiver 10, and the transistorized amplifier 17 in the audio channel, represent controllable coupling stages whose operation can in turn control the operation of picture tube 21 and speaker 19 respectively. More particularly, a sufficient positive going potential applied to the base of emitter follower 16 can cause the potential applied to the cathodes in cathode ray tube 21 to also go positive, and thereby cut off the electron beam in the tube, since the control grids adjacent to those cathodes are near ground potential. By the same token, a positive potential applied to the first stage of transistor amplifier 17 biases the second stage of amplifier 17 to cutoff thereby rendering the sound channel of the receiver inoperative. Stages 16 and 17 are controlled, in the manner described, by the improved solid state muter circuit of the present invention to permit normal operation of those channels when properly spaced picture carrier and sound carrier signals are received, but to render the picture and sound channels inoperative when proper television signals are not being received.

For purposes of operating the muter circuit, the intercarrier frequency of 4.5 MC is derived at point 21 from the output of the sound IF amplifier limiter 14 in receiver 10. This derived intercarrier frequency is fed to the control electrode of FET 22 (a field effect transistor). The output of FET 22 energizes tuned circuits 23 and 24 which are, as illustrated, separate from the intercarrier sound system of receiver 10. Tuned circuits 23, 24 are preferably of high Q and are sharply tuned to the intercarrier frequency of 4.5 MC.

As a practical matter, the signal at point 21 in receiver 10 is normally limited by stage 14 for the FM discriminator 15 following stage 14. However if this is not the case, a diode limiter 25 may be connected to the input of FET 22 as illustrated to eliminate high surges of noise. The cutoff point of limiter 25 is adjusted by a DC potential derived from a potentiometer 26 so as to permit a predetermined amount of the 4.5 MC intercarrier frequency to pass unaffected, but to cut off any noise pulse that may be substantially higher than the set limit.

It is important that the noise level of signals applied via FET 22 to tuned circuits 23, 24 be of low value since high level noise signals can act in the same manner as television signals to partially open the picture and sound channels of receiver 10. In the circuit illustrated, the 4.5 MC signal appearing across tuned circuit 24 is fairly free of noise due to the limiting function of receiver stage 14 and/or of diode limiter 25, and due also to the narrow bandwidth of the tuned circuit. If desired, the bandwidth of the tuned circuit may be further narrowed, and the effect of noise thereby further reduced, by known techniques such as the addition of a crystal filter.

By the arrangement described, a signal appears across tuned circuit 24 only in response to the generation of an intercarrier frequency at point 21 in receiver 10, due in turn to reception by the receiver of properly spaced picture carrier and sound carrier television signals. The signal across tuned circuit 24, when it occurs, is coupled via a diode 27 to a capacitor 28 which serves to accumulate a charge potential of negative polarity at the control electrode of a second FET 29. FET 29 is so energized that, in the absence of a negative control signal or potential applied to its control electrodes, FET 29 is conductive. A negative signal of sufficient magnitude will, however, cut off FET 29.

A resistor 30 is connected to the source electrode of FET 29, and source electrode current flowing through resistor 30 in the absence of a signal applied to the control electrode of FET 29 causes a DC potential in the order of 7 volts to be generated across resistor 30. A signal applied to the control electrode of FET 29, operative to cut off that source current, prevents generation of the voltage across resistor 30. As a result of this arrangement, therefore, a voltage in the order of 7 volts appears across resistor 30 in the absence of a control signal across tuned circuit 24; and the presence of a control signal across tuned circuit 24 in turn drops the voltage at the upper end of resistor 30 to substantially ground potential.

The voltage at the upper end of resistor 30 is applied, via two separate coupling paths, to the base of transistor emitter follower 16 and to the base of the first stage of transistor amplifier 17 respectively. More particularly, the positive potential appearing at the upper end of resistor 30 is coupled, when it occurs, via a resistor 31 and diode 33 to the base of emitter follower 16 and operates, in the manner already described, to cut off the electron beam in picture tube 21. A positive potential is also normally applied to the base of emitter follower 16 through a variable resistance 34 which is used in conventional fashion as a brilliance control in the receiver. Diode 33 acts to prevent any voltage feedback from the emitter follower 16 when brilliance control 34 is adjusted for low brilliance (high voltage) since such feed back voltage could conceivably affect the audio output inasmuch as the control potential for the audio channel of the receiver also originates across resistor 30. In this latter respect, the positive end of resistor 30 is also coupled via a resistor 32 to the first stage of amplifier 17 and operates, again in the manner already described, to render the sound producing means 19 inoperative.

Notwithstanding the fact that noise signals are prevented, in large part, from producing spurious output signals across tuned circuit 24, it may occur that, when no television signal is being received, the ambient noise signal level may be so high that, with the help of rectifier 27, a significant negative potential could accumulate across capacitor 28. If this were to occur, FET 29 would have its conductivity reduced and, as a result, the voltage generated across resistor 30 would be diminished (or perhaps even eliminated) so as to render the audio and picture channels of the receiver at least partially operative. To prevent this from occurring, a slight positive bias is supplied via variable resistance 35 to the control element of FET 29.

It will be noted that the fixed positive DC bias so applied to the control element of FET 29 has a polarity which is opposite to the negative potential which would otherwise be applied to said control element by reason of the noise signals; and the magnitude of the positive bias so applied is selected, e.g., by adjustment of variable resistor 35, so as to nullify any spurious negative signal resulting from the reception of noise alone. This bias arrangement at the control electrode of FET 29 accordingly helps to assure that the muter operation is rendered less sensitive to noise signals. Care must be taken, however, to assure that when weak television signals are received, there is enough 4.5 MC signal present across tuned circuit 24 to produce a voltage on the control element of FET 29 sufficient to overcome the positive bias and to turn on the receiver channels fully. This operation can be assured by adjusting variable resistor 35 in relation to the weakest television signal present in the area of reception, with the adjustment being such that the sum of the positive bias applied via resistor 35 and the negative bias applied as a result of the received weak signal is just enough to cut off the source current though FET 29.

Inasmuch as the overall operation of the muter circuit is such that the current through FET 29 is zero when television signals are received, ambient noise even at a high noise level cannot affect the operation of the receiver. Any voltage impressed on the control electrode of FET 29 as a result of received noise signals is of the same polarity as the control signal impressed on said control electrode by reason of the received television signals, and FET 29 remains cut off notwithstanding the presence of noise signals. Noise is thus totally incapable of affecting the operation of the muter when television signals are received; and noise is also substantially eliminated as a factor when no television signals are received by the various expedients already described.

While I have thus described a preferred embodiment of the present invention, many variations will be suggested to those skilled in the art. It must therefore be understood that the foregoing description is intended to be illustrative only and not limitative of my invention; and all such variations and modifications as are in accord with the principles described are meant to fall within the scope of the appended claims.

Having thus described my invention, I claim:

1. In a television receiver, tunable signal translating means responsive to the reception of picture carrier and sound carrier signals spaced from one another by an intercarrier frequency for supplying video signals via a first controllable circuit to a picture producing means, said receiver including an intercarrier sound system for supplying frequency modulated sound signals via a second controllable circuit to a sound producing means, tuned circuit means separate from said intercarrier sound system and sharply tuned to said intercarrier frequency, said tuned circuit means being coupled to said signal translating means for selectively producing a control signal upon reception of said spaced sound and picture carrier signals; a transistor having a control electrode coupled to said tuned circuit means and an output electrode coupled to an impedance, means for so energizing said transistor that, in the absence of a control signal applied from said tuned circuit means to said control electrode, said transistor conducts to generate a potential across said impedance, and upon occurrence of said control signal said transistor is rendered non-conductive to prevent generation of said potential across said impedance, means coupling said impedance to said first controllable circuit, said first controllable circuit being responsive to the generation of said potential to render said picture producing means inoperative, and further means coupling said impedance to said second controllable circuit, said second controllable circuit being responsive to the generation of said potential to render said sound producing means inoperative.

2. The combination of claim 1 including bias means coupled to said control electrode, the magnitude and polarity of said bias means being selected to nullify spurious signals produced by said tuned circuit means due to reception of noise whereby said bias means maintains said transistor conductive when noise is received in the absence of said spaced sound and picture carrier signals.

3. The combination of claim 1 including bias means coupled to said control electrode, said bias means producing a bias potential having a polarity opposing the polarity of any control signal coupled from said tuned circuit means to said control electrode, the magnitude of said bias potential being sufficient to nullify spurious control signals produced by said tuned circuit means when said receiver receives only noise signals but being insufficient to nullify a control signal produced by said tuned circuit means when said receiver receives the weakest spaced sound and picture carrier signals present in the area of reception.

4. The combination of claim 3 including means for adjusting the magnitude of said bias potential.

5. The combination of claim 1 wherein at least one of said controllable circuits comprises a transistor amplifier.

6. The combination of claim 1 wherein at least one of said controllable circuits comprises a transistor emitter follower.

7. The combination of claim 1 wherein said transistor comprises a field effect transistor, said impedance comprising a resistor connected to the source electrode of said transistor.

8. The combination of claim 1 including a field effect transistor coupling said tuned circuit means to said signal translating means.

9. The combination of claim 8 including a diode limiter coupled to said field effect transistor for reducing the coupling of noise signals to said tuned circuit means.

10. A television receiver comprising signal translating means responsive to reception of picture carrier and sound carrier signals spaced from one another by an intercarrier frequency to produce video signals and frequency modulated sound signals, first transistor coupling means for coupling said video signals to a picture producing means, second transistor coupling means for coupling said sound signals to a sound producing means, tuned circuit means coupled to said signal translating means and tuned to said intercarrier frequency for producing a control signal upon reception by said receiver of said spaced picture carrier and sound carrier signals, a field effect transistor, rectifier means coupling the control electrode of said transistor to said tuned circuit means for impressing a control signal of predetermined polarity on said control electrode operative to cut off said field effect transistor upon reception by said receiver of said spaced carrier signals, impedance means coupled to another electrode of said field effect transistor and responsive to conduction of said transistor in the absence of said control signal for generating a potential, means coupling said generated potential to said first transistor coupling means for rendering said picture producing means inoperative in the absence of said control signal, and further means coupling said generated potential to said second transistor coupling means for rendering said sound producing means inoperative in the absence of said control signal.

11. The receiver of claim 10 including means for impressing a bias potential on said control electrode, said bias potential having a polarity opposite to said predetermined polarity and having a magnitude less than the magnitude of control signal impressed on said control electrode when said receiver receives said spaced carriers, whereby said bias potential is operative to maintain said transistor conductive, thereby to maintain said sound producing means and said picture producing means inoperative, when spurious control signals due to reception of noise signals alone are produced by said tuned circuit means.

12. The receiver of claim 11 including means for adjusting the magnitude of said bias potential.

13. The receiver of claim 12 including a further field effect transistor coupling said tuned circuit means to said signal translating means.

14. The receiver of claim 11 wherein said signal translating means includes an intercarrier sound system for producing said frequency modulated sound signals, said tuned circuit means being separate from said intercarrier sound system and being sharply tuned to said intercarrier frequency.

15. The receiver of claim 11 wherein said rectifier means includes a diode coupled to said tuned circuit means, and a capacitor coupled to the side of said diode remote from said tuned circuit means for accumulating a charge potential acting as the control signal of predetermined polarity impressed on said control electrode.

16. The receiver of claim 10 including means for applying a control voltage to said first transistor coupling means for controlling the brilliance of a picture produced by said picture producing means, said further means coupling said generated potential to said second transistor coupling means including a diode poled to prevent said brilliance control voltage from affecting the operation of said second transistor coupling means.

17. The receiver of claim 10 wherein the polarity of any control signal impressed on said control electrode as a result of received noise signals is the same as the polarity of any control signal impressed on said control electrode as a result of received television signals, whereby the operation of said field effect transistor is insensitive to noise when television signals are being received and said field effect transistor remains cut off upon reception of television signals notwithstanding simultaneous reception of noise signals.

* * * * *